UNITED STATES PATENT OFFICE.

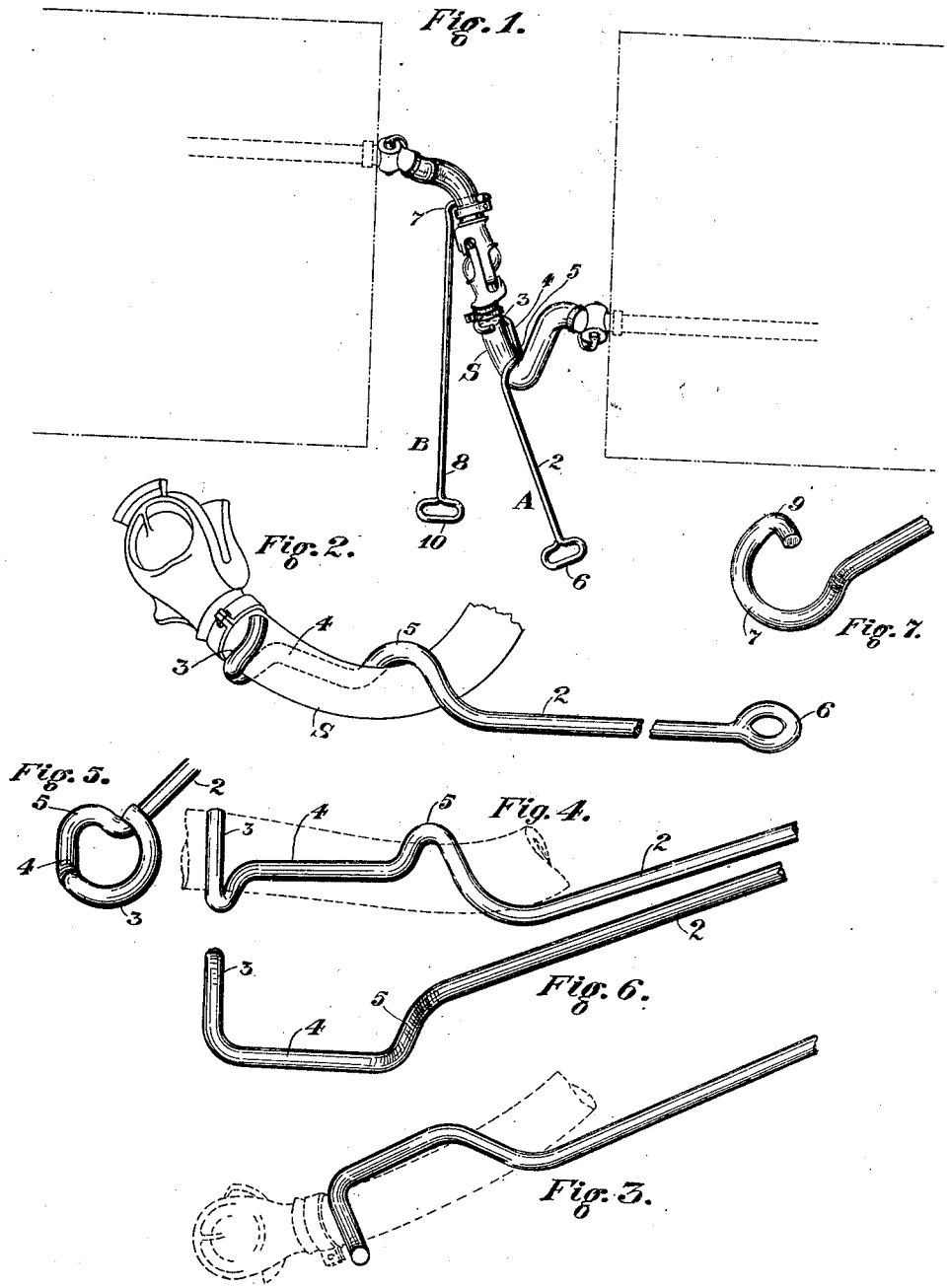

CHARLES L. COURSON, OF PITCAIRN, PENNSYLVANIA.

AIR-HOSE COUPLING AND UNCOUPLING TOOL.

1,056,506.  Specification of Letters Patent. Patented Mar. 18, 1913.

Application filed November 9, 1911. Serial No. 659,367.

*To all whom it may concern:*

Be it known that I, CHARLES L. COURSON, a citizen of the United States, residing at Pitcairn, in the county of Allegheny and State of Pennsylvania, have invented certain new and useful Improvements in Air-Hose Coupling and Uncoupling Tools, of which the following is a specification.

My invention consists of an improved device for handling the coupling ends of air brake or other hose used on cars.

It has for its object to provide a device which may be used to grasp the hose without the necessity of going between the cars and for holding it in proper position to effect coupling or uncoupling with the other hose terminal of the adjacent car.

Another object is to provide a tool for such purpose of simple economical construction made of a continuous bar, without welding, and having in one continuous piece the combination of bends and engaging parts adapted to operate in the manner intended.

In the drawings: Figure 1 is a plan view showing the use of the tool with a companion tool in the operation of coupling the hose terminals of an air brake or other system. Fig. 2 is an enlarged view showing the tool in engagement with the hose in side elevation. Fig. 3 is a similar view showing the tool from another point of view, as it is laid around the hose. Fig. 4 is a plan view of the tool. Fig. 5 is an end view of the tool. Fig. 6 is an under plan view. Fig. 7 is a view of the hook end of the companion tool for the other hose, illustrated in Fig. 1.

In its entirety the tool A is made of a continuous rod or bar 2 of iron or steel having at its terminal a rounded hook 3 adapted to embrace the end of the hose section S immediately back of the coupling terminal T thereof. Rearwardly of hook 3 and extending backwardly in the line of general direction of the main shank 2, but considerably out of parallelism therewith, is a short substantially straight section 4. Said section 4 is off-set laterally from the general line of direction of shank 2, a distance of about the diameter of the hose S, so that when applied to the hose, as shown, the two generally straight sections, 2 and 4, will lie along opposite sides of the hose.

Between straight sections 2 and 4 and at a comparatively short distance back of hook 3, is a rounded U shaped neck 5, arching over the space to be occupied by the hose and arranged diagonally across the line of direction of straight sections 2 and 4, and in the opposite direction of curvature to hook 3, as in Fig. 3. At its outer end the shank 2 is provided with a handle 6 of any suitable form. The companion tool B is generally similar as to its handle portion, but is merely provided at its working end with a half round hook or crook 7 disposed somewhat diagonally across the line of direction of main shank 8 and terminating in an upwardly or outwardly turned tip 9. At the other end tool B is also provided with a handle 10.

In using the device, the hose 5 is engaged by the hook 3 and neck 5 as it depends in its normal position below the pipe connection at one side of the center of the car. The straight section 4 lies along underneath the hose, and the straight section or shank 2 lies along above the hose backwardly beyond the part engaged by the neck 5. The hose section is somewhat stiff, and by using the tool in the manner of a lever, when thus applied, it will operate to turn the coupling terminal upwardly or to any position desired for coupling, in the same manner as is now done by hand. In this operation the hose is somewhat kinked at the bending point, as shown in Fig. 2. The other hose S' to be coupled is also grasped by tool B, its hook 7 engaging back of the coupling head, as shown, and its coupling terminal is drawn up into position for engagement with the first named hose, and connected. The uncoupling operation is effected in an equally quick and easy manner. If desired, the handle ends of the tools may be supported by any suitable attaching devices, as hooks, from the body of the car.

The advantages of the invention reside in the positive engagement which may be made with the hose, the supporting effect of the straight section 4, the rounded U shaped neck formed in the continuous length of rod section, and the straight continuation beyond the neck section toward the handle. These features all contribute to ease and simplicity of manufacture and use, while avoiding any projecting points or the necessity of welding at any point.

The companion tool B, with its half round hook and off-set terminal tip, is well adapted to coöperate with the tool A in the manner described.

What I claim is:

A coupling tool for air brake hose terminals consisting of a one-piece integral unobstructed rod member having a main handle portion, a terminal open-sided U-shaped hook portion lying transversely of the line of the handle at the other end adapted to form an open non-gripping support for the hose, a rearwardly extending straight portion forming a continuation of the terminal hook portion angularly off-set from the line of the handle and adapted to lie along the side of the hose, and an open-sided U-shaped neck portion connecting said straight portion with the handle, lying diagonally across from the straight portion to the handle and adapted to form an open embracing non-gripping fulcrum bearing engagement with the hose, substantially as set forth.

In testimony whereof I hereunto affix my signature in the presence of two witnesses.

CHARLES L. COURSON.

Witnesses:
W. H. MARTIN,
J. F. COURSON.